July 7, 1970   H. J. BALDWIN ET AL   3,519,121

SUPPORT STRUCTURE FOR ENDLESS BAND

Filed Aug. 5, 1968   3 Sheets-Sheet 1

INVENTORS.
HERMAN J. BALDWIN
DAVID I. MC DONALD

BY *Frank C. Leach jr.*

ATTORNEY.

July 7, 1970 H. J. BALDWIN ET AL 3,519,121
SUPPORT STRUCTURE FOR ENDLESS BAND
Filed Aug. 5, 1968 3 Sheets-Sheet 3

United States Patent Office 3,519,121
Patented July 7, 1970

3,519,121
SUPPORT STRUCTURE FOR ENDLESS BAND
Herman J. Baldwin and David I. McDonald, Cincinnati, Ohio, assignors to The Cincinnati Milling Machine Co., Cincinnati, Ohio, a corporation of Ohio
Filed Aug. 5, 1968, Ser. No. 750,032
Int. Cl. B65g 15/00
U.S. Cl. 198—184          12 Claims

ABSTRACT OF THE DISCLOSURE

The end rollers, which support an endless band passing thereover, are formed with a bow or camber therein prior to the belt being placed under tension. When the belt is tensioned, the end rollers form a substantially straight line over which the belt passes rather than the roller being curved inwardly as normally occurs when the belt is tensioned.

When utilizing an endless belt to move material relative to a cutting blade structure in a manner such as that shown and described in the copending patent application of George W. Sederberg for "Material Cutting Machine Having Reciprocating Cutting Blade Adapted To Enter Material Without an Entrance Cut," Ser. No. 726,657, filed May 6, 1968, and assigned to the same assignee as the assignee of the present application, it is necessary to maintain the endless band or belt on each side of the cutting blade structure under tension. This is required to insure that both of the bands are positively driven at the same surface speed.

When an endless band is placed under tension such that positive driving of the endless band is obtained, this tension exerts a sufficient force on the end rollers over which the band passes when it changes direction to cause a bowing or curving of the end rollers since the ends of each of the end rollers are rotatably supported in fixed structure against any movement. This inward movement of each of the end rollers in its central portion is not desirable since this affects tracking of the band so that the desired pattern may not be cut in the material, which is supported on the band, due to the movement of the band in a sidewise or transverse direction.

The present invention satisfactorily overcomes the foregoing problem by providing a support structure for an endless band in which the end rollers will not have any curve or bow formed therein when the endless band or belt is subjected to the desired tension. Thus, when using the support structure of the present invention, the endless band passes over end rollers having a substantially straight line in their central portions.

As a result, good tracking of the band is obtained when using the support structure of the present invention. Thus, the desired pattern will be cut in the material supported on an endless band, which is supported by the support structure of the present invention, when utilized with a cutting machine such as that shown and described in the aforesaid Sederberg application, for example.

An object of this invention is to provide a support structure for an endless band under tension in which the end rollers are not bowed or curved inwardly toward their longitudinal axes.

Another object of this invention is to provide a support structure for an endless band that will cause the endless band to track properly.

Other objects of this invention will be readily perceived from the following description, claims, and drawings.

This invention relates to a support structure for a moving endless band. The support structure includes first and second end rollers having the endless band pass thereover as the endless band changes direction. Each end of the first end roller is rotatably supported by first means while each end of the second end roller is rotatably supported by second means. The support structure has third means disposed between the first and second end rollers and adjacent the first end roller to produce a bow in the first end roller extending away from the second end roller when the endless band is not under tension.

The attached drawings illustrate a preferred embodiment of the invention, in which.

Figure 1:
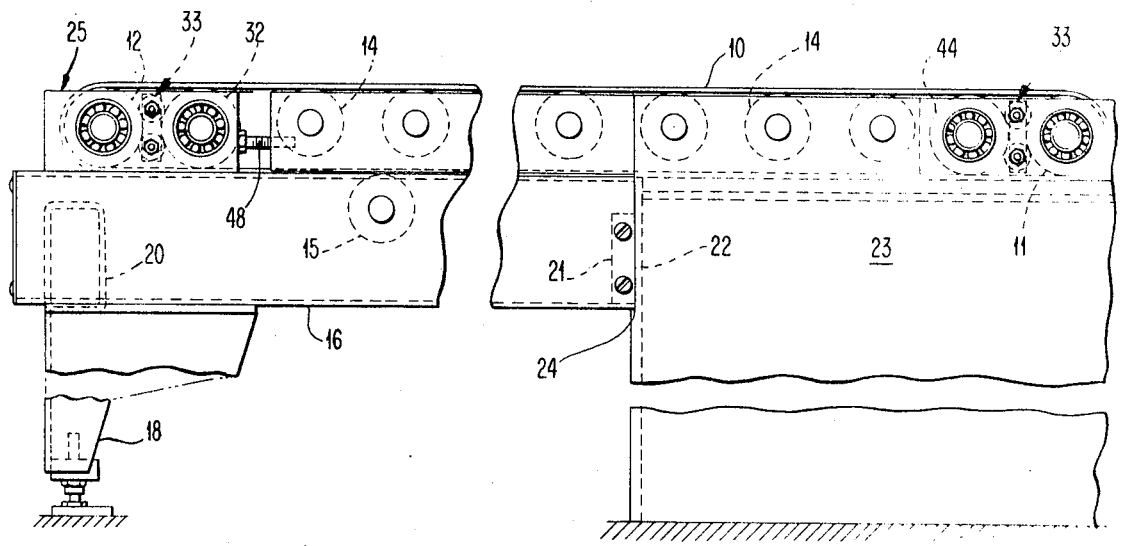
FIG. 1 is a side elevational view of a support structure of the present invention for supporting an endless band.

Referring to the drawings and particularly FIG. 1, there is shown an endless band 10 of the type utilized in the aforesaid Sederberg application for moving the material, which is to be cut, relative to the cutting blade structure. The endless band 10 passes around an end roller 11 adjacent the cutting blade structure and an end roller 12 remote from the cutting blade structure. The end roller 11 is driven by suitable means (not shown) to cause the endless band 10 to be driven.

Each of the rollers 11 and 12 is cylindrical shaped for about 5/7 of its length. However, the last 1/7 of each end of the length of the rollers 11 and 12 is preferably formed with a slight taper. For example, with the roller having a length of approximately 76 inches and a diameter of 3.062" in the portion in which there is no tapering, the diameter of the roller at each end would be approximately 3.042". Thus, this is only a very slight taper. Furthermore, this taper is not a requisite for the support structure of the present invention.

The endless band 10 has both its upper and lower spans supported intermediate the end rollers 11 and 12. Thus, a plurality of upper support rollers 14 supports the lower surface of the upper span of the endless band 10 while a plurality of lower support rollers 15 supports the lower surface of the lower span of the band 10 between the end rollers 11 and 12.

The rollers 11, 12, 14, and 15 are supported by a table structure. The table structure includes channels 16 and 17 disposed on opposite sides of the endless band 10 with one end of each of the channels 16 and 17 being supported by an upstanding leg (one shown at 18 for the channel 16). The legs (one shown at 18) are connected to each other by a channel 20 whereby the channels 16 and 17 are fixedly secured to each other.

The other ends of the channels 16 and 17 are fixedly connected together by a channel 21, which is fixedly secured to an upstanding support 22 of a box-like structure 23 from which the bridge extends upwardly as more particularly shown and described in the aforesaid Sederberg application. The other ends of the channels 16 and 17 rest on a shoulder 24, which is formed in the support 22 as shown in FIG. 1. It should be understood that the channels 16 and 17 are supported intermediate their ends by suitable legs (not shown) depending upon the length of the channels 16 and 17. The length of the endless band 10 determines the length of the channels 16 and 17.

Figure 5:
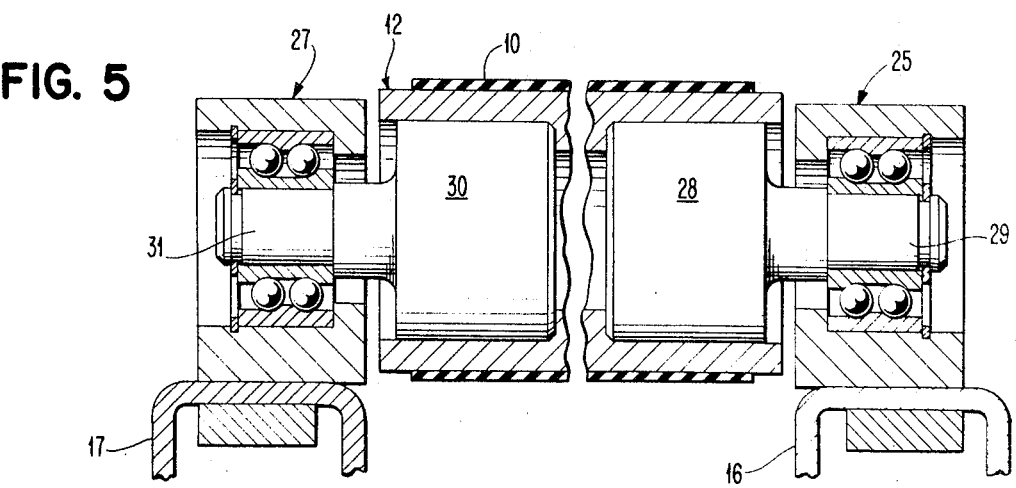
FIG. 5 is a sectional view showing the mounting of one of the end rollers and taken along line 5—5 of FIG. 4.
Figure 4:
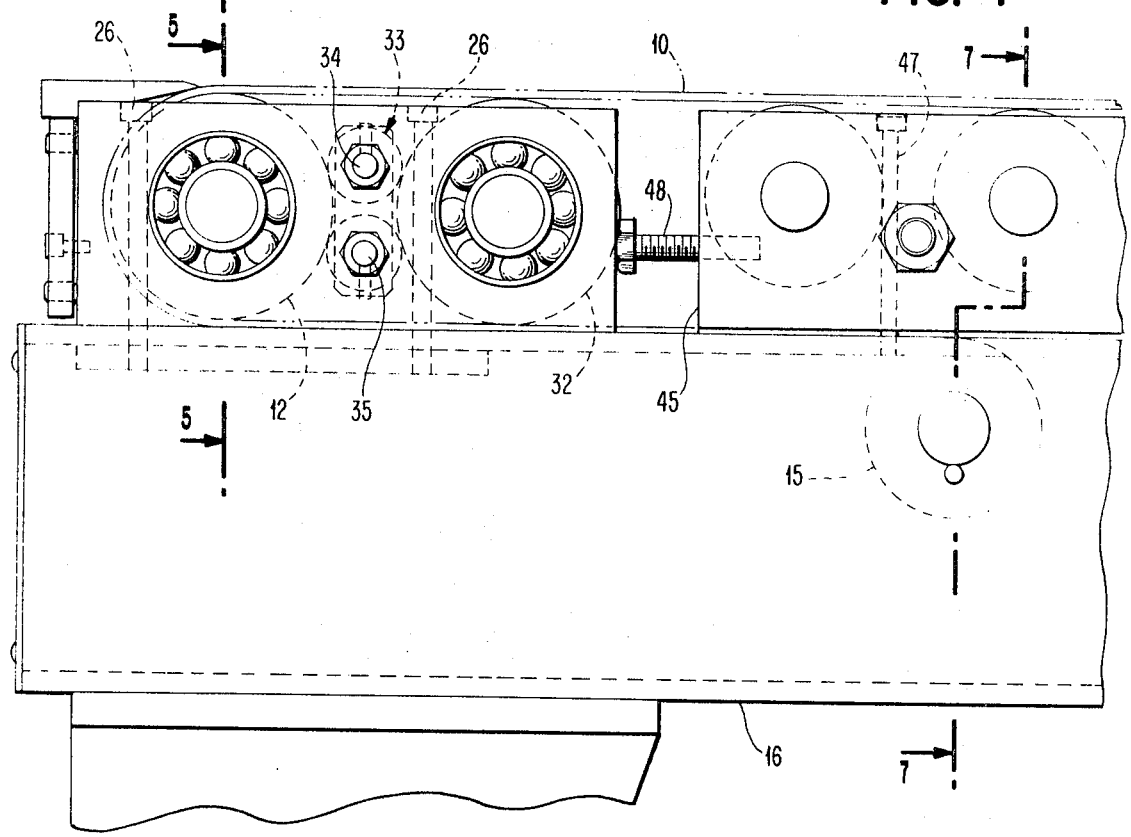
FIG. 4 is an enlarged side elevational view of a portion of the structure of FIG. 1.

As shown in FIG. 5, the channel 16 has a support 25 releasably connected thereto by bolts 26 (see FIG. 4). The channel 17 has a support 27 (see FIG. 5) releasably connected thereto by bolts (not shown), which are similar to the bolts 26. Thus, the supports 25 and 27 are mounted on the channels 16 and 17 for sliding movement relative thereto.

The end roller 12 is rotatably mounted in the supports 25 and 27. As shown in FIG. 5, the end roller 12 has a cylindrical member 28 fixedly mounted in one end thereof with a shaft 29 extending therefrom and rotatably supported in the support 25. Likewise, the other end of the end roller 12 has a cylindrical member 30 fixedly secured thereto with a shaft 31 extending therefrom and rotatably mounted in the support 27.

Accordingly, by mounting the end roller 12 in the movable supports 25 and 27, the position of the end roller 12 with respect to the end roller 11 may be adjustable whereby the band 10 may be placed under tension. Thus, the end roller 12 is adjustable relative to the fixed structure.

The movable supports 25 and 27 also rotatably support a roller 32, which cooperates with the end roller 12 through roller units 33 to form the bow in the end roller 12 before the endless band 10 is placed under tension. The roller 32 has its opposite ends rotatably mounted in the supports 25 and 27 in the same manner as the end roller 12. Thus, the cooperating roller 32 is mounted for movement with the end roller 12 when the supports 25 and 27 are moved to place the band 10 under tension. Prior to the roller units 33 being adjusted to create a bow in the end roller 12 and the cooperating roller 32, the longitudinal axes of the rollers 12 and 32 are substantially parallel to each other.

Figure 2:
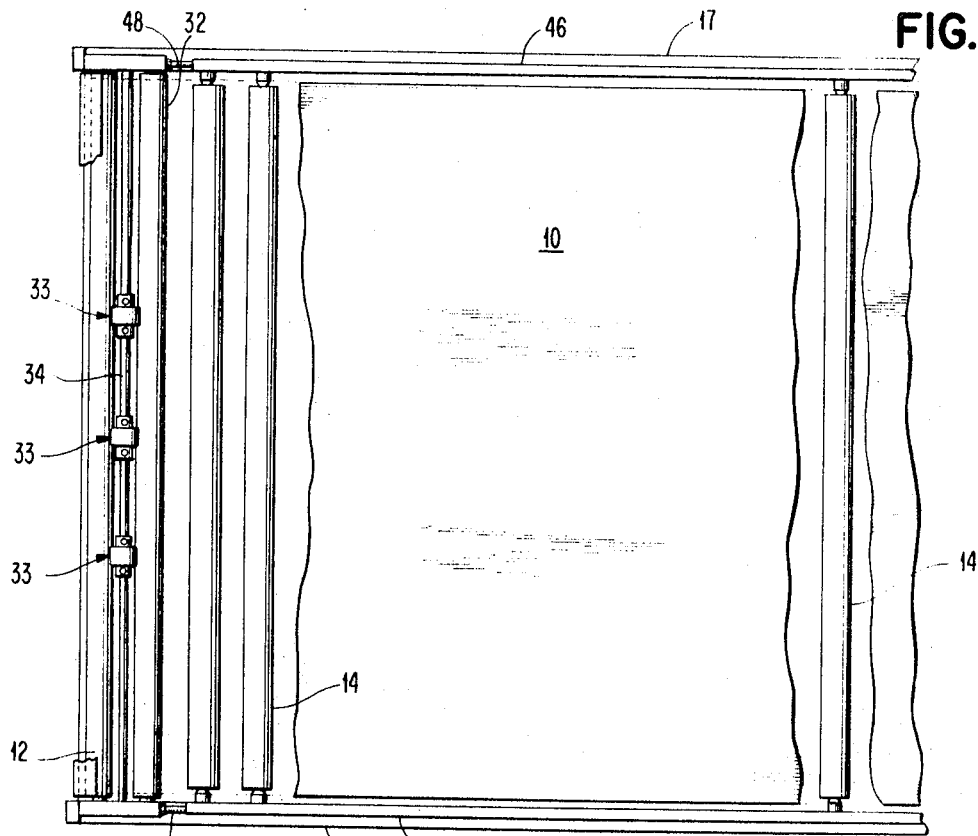
FIG. 2 is a top plan view of a portion of the structure of FIG. 1 and illustrating the relation of one of the end rollers to the roller units that form the bow therein.
Figure 3:
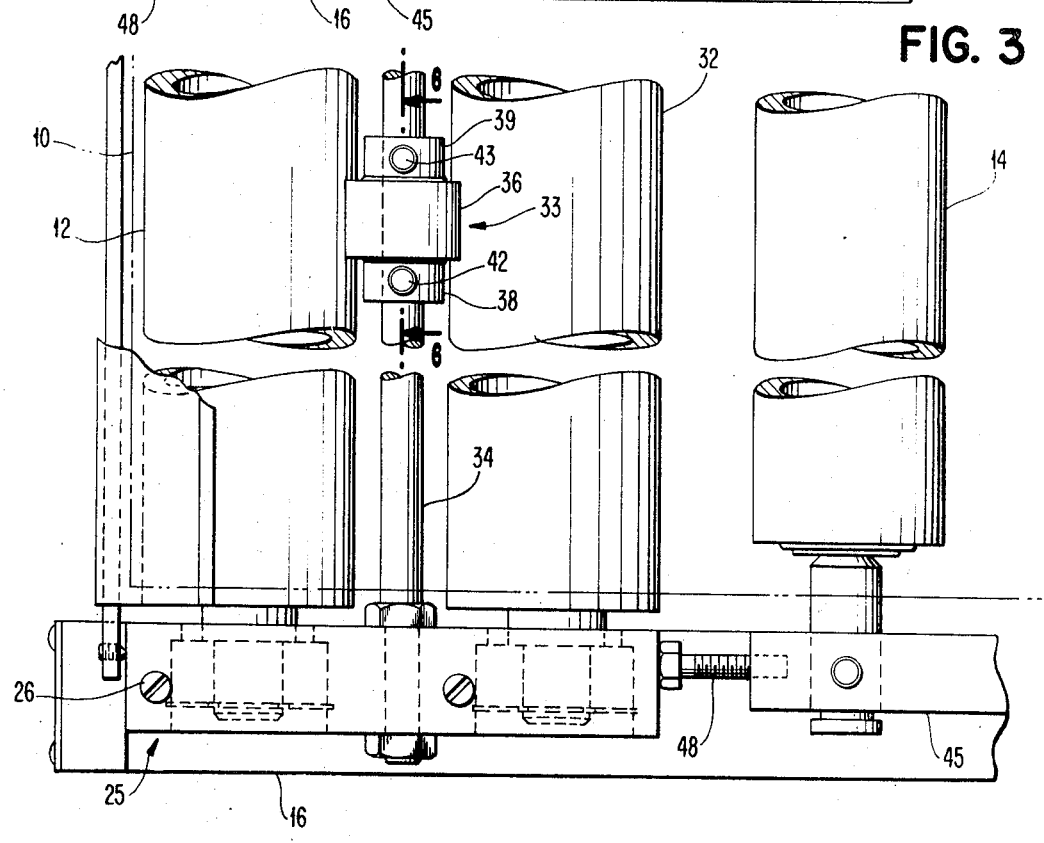
FIG. 3 is an enlarged top plan view of a portion of the structure of FIG. 1.

As shown in FIG. 2, three of the roller units 33 are disposed between the end roller 12 and the cooperating roller 32. One of the roller units 33 is disposed an equal distance from each of the ends of the rollers 12 and 32 while the other two roller units 33 are positioned on each side thereof. When the band 10 has a width of 76", the outermost of each of the roller units 33 is disposed approximately 12" from the central roller unit 33 with the distance being measured between the centers of the roller units 33. Thus, the roller units 33 are disposed adjacent the central portions of the end roller 12 and the cooperating roller 32.

It should be understood that the number of the roller units 33 may be more or less than the three shown and the spacing between the roller units 33 may be different than that illustrated. The width of the endless band 10 and the tension thereon determines the number of the roller units 33 and their spacing.

As shown in FIG. 4, each of the roller units 33 is mounted on an upper rod 34 and a lower rod 35. The rods 34 and 35 are fixedly secured to the supports 25 and 27 and extend therebetween. The axes of the rods 34 and 35 are disposed substantially parallel to each other and to the longitudinal axes of the rollers 12 and 32 when the endless band 10 is not under tension and no curvature is formed in the rollers 12 and 32.

Figure 6:
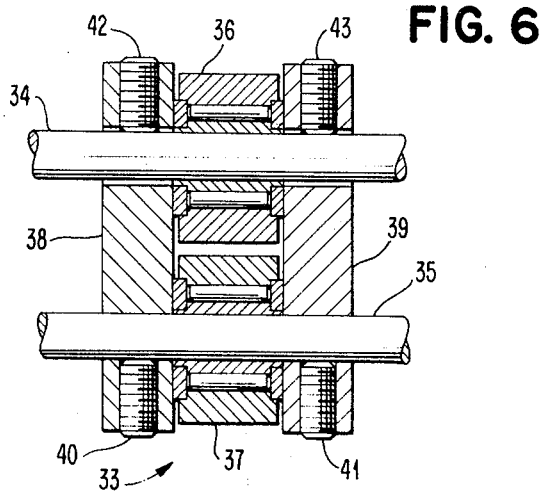
FIG. 6 is a sectional view of a roller unit for producing a bow in an end roller and taken along line 6—6 of FIG. 3.

As shown in FIG. 6, each of the roller units 33 includes a roller 36, which is rotatably mounted on the upper rod 34, and a roller 37, which is rotatably mounted on the lower rod 35. The rollers 36 and 37 are preferably needle bearings but any other suitable roller may be employed.

Retainers 38 and 39 are disposed on opposite sides of the rollers 36 and 37 to retain them in the desired position along the rods 34 and 35. The retainer 38 is locked in position on the lower rod 35 by a set screw 40, which engages against the lower rod 35. The retainer 39 is retained on the lower rod 35 by a set screw 41. Thus, when the set screws 40 and 41 have been moved into engagement with the lower rod 35, the retainers 38 and 39 are fixedly secured to the lower rod 35 against sliding movement relative thereto.

The retainer 38 has an adjusting screw 42 threadedly secured thereto and cooperating with the upper rod 34. The retainer 39 has a similar adjusting screw 43, which is threadedly connected to the retainer 39, adapted to be moved into engagement with the upper rod 34.

Accordingly, when the adjusting screws 42 and 43 are threaded into engagement with the upper rod 34, the rollers 36 and 37 will be moved toward each other. As a result, the central portions of the end roller 12 and the cooperating roller 32 tend to bow or curve out away from each other as do the rods 34 and 35. This produces a curve in the axes of each of the rollers 12 and 32 so that they diverge away from each other. This also produces the same type of bow or curve in the outer surface of the end roller 12 and the cooperating roller 32. Then, when the belt 10 is placed under tension, the tension force returns the end roller 12 to the position in which its longitudinal axis has no bow so that there is no bow in the end roller 12 while the cooperating roller 32 has a bow of twice the amplitude of the bow that was placed in the roller 32 by the roller units 33.

The end roller 11, which is rotatably mounted by the box-like structure 23, and a cooperating roller 44, which also is rotatably mounted by the box-like structure 23, have cooperating roller units 33 therebetween in the same manner as do the end roller 12 and the cooperating roller 32. Thus, when the roller units 33, which are disposed between the rollers 11 and 44, are adjusted, the same type of bow is formed in the rollers 11 and 44. Again, when the endless band 10 is placed under tension, the bow in the end roller 11 is eliminated while the amplitude of the bow in the cooperating roller 44 is double the amplitude of the bow created in the roller 44 by the roller units 33 prior to the band 10 being tensioned.

It should be understood that the amount of the bow in the rollers 12 and 32 and the rollers 11 and 44 is related to the tension placed on the band 10. This is because the tension placed on the band 10 must remove the bow in the rollers 11 and 12.

Figure 7:
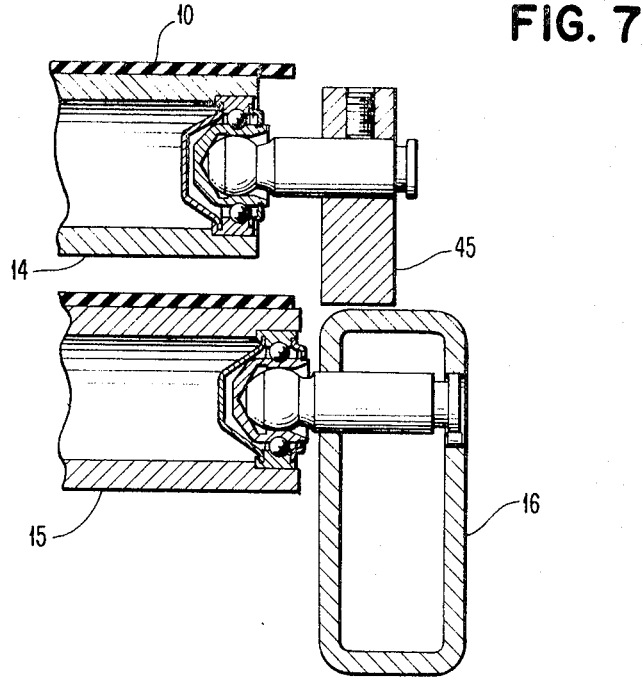
FIG. 7 is a sectional view illustrating mounting of the support rollers for the upper and lower spans of the endless band intermediate the end rollers and taken along line 7—7 of FIG. 4.

The lower support rollers 15 are rotatably mounted in the channels 16 and 17. The support of one of the rollers 15 in the channel 16 is shown in FIG. 7.

Each of the upper support rollers 14 is rotatably mounted in bars 45 and 46 (see FIGS. 2 and 7), which are secured to the channels 16 and 17, respectively, by bolts 47 (see FIG. 4). Thus, the bars 45 and 46 are fixedly secured against movement through being connected to the channels 16 and 17, respectively.

When it is desired to produce tension in the endless band 10, the bolts 26 and the bolts, which secure the support 27 to the channel 17, are turned to release the supports 25 and 27 from connection to the channels 16 and 17. Then, adjusting screws 48, which are threadedly connected to the bars 45 and 46 carrying the upper support rollers 14 and having their heads bearing against one end of each of the supports 25 and 27, are adjusted. Thus, by appropriately adjusting the screws 48, the supports 25 and 27 are moved relative to the fixed channels 16 and 17. As a result, the band 10 is placed under the desired tension.

Accordingly, it is necessary to initially adjust the roller units 33 to create the desired bow in the end rollers 11 and 12. Then, adjusting the screws 48 after the supports 25 and 27 have been released from attachment to the channels 16 and 17 results in the screws 48 moving the supports 25 and 27 to the desired position. As a result, this causes the desired tension to be placed on the band 10. This movement of the supports 25 and 27 to the left (as viewed in FIGS. 1–4) results in the bow, which has been created in the end rollers 11 and 12 by the roller units 33, being removed due to the force exerted by the band 10 while the cooperating rollers 32 and 44 have a double bow therein.

While the adjustment for the tension of the endless band 10 has been shown as being produced by moving only the end roller 12, it should be understood that the end roller 11 could be adjustably mounted rather than the end roller 12 or both of the end rollers 11 and 12 could be adjustably mounted to place the band 10 under the desired tension. However, it is only necessary for one of the end rollers 11 and 12 to be adjustably mounted to produce the desired tension on the band 10.

While the cooperating rollers 32 and 44 have been shown as engaging both the upper and lower spans of the endless band 10, it should be understood that it is not necessary for the rollers 32 and 44 to engage either of the spans of the band 10. Additionally, the rollers 32 and 44 might engage only one of the spans of the band 10 depending on the path of the band 10 as it moves on and off of the end rollers 11 and 12.

An advantage of this invention is that it eliminates the bow in the rollers over which an endless band passes as the endless band changes direction. Another advantage of this invention is that it insures good tracking of an endless band.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. A support structure for a moving endless band, said support structure including:
    first and second end rollers having the endless band pass thereover as the endless band changes direction;
    first means to rotatably support each end of said first end roller;
    second means to rotatably support each end of said second end roller;
    and third means disposed between said first and second end rollers and adjacent said first end roller to produce a bow in said first end roller extending away from said second end roller when the endless band is not under tension.

2. The support structure according to claim 1 including:
    fixed means;
    means to releasably connect said first rotatably support means to said fixed means;
    and means to move said first rotatably support means relative to said fixed means to produce a tension on the endless band whereby said first end roller has the bow therein removed.

3. The support structure according to claim 1 including fourth means disposed between said third means and said second end roller and adjacent said second end roller to produce a bow in said second end roller extending away from said first end roller when the endless band is not under tension.

4. The support structure according to claim 3 including:
    fixed means;
    means to releasably connect said first rotatably support means to said fixed means;
    and means to move said first rottably support means relative to said fixed means to produce a tension on the endless band whereby said first end roller and said second end roller have the bows therein removed.

5. The support structure according to claim 3 in which: said third means includes:
    a first cooperating roller disposed between the spans of the endless band;
    said first rotatably support means supporting each end of said first cooperating roller so that the axes of said first cooperating roller and said first end roller are substantially parallel;
    and means disposed between said first end roller and said first cooperating roller to move the central portions of said first end roller and said first cooperating roller away from each other to form bows of opposite curvature in said first end roller and sad first cooperating roller whereby said first cooperating roller are curved away from each other;
    and said fourth means includes:
    a second cooperating roller disposed between the spans of the endless band;
    said secondary rotatably support means supporting each end of said second cooperating roller so that the axes of said second cooperating roller and said second end roller are substantially parallel;
    and means disposed between said second end roller and said second cooperating roller to move the central portions of said second end roller and said second cooperating roller away from each other to form bows of opposite curvature in said second end roller and said second cooperating roller whereby the axes of said second end roller and said second cooperating roller are curved away from each other.

6. The support structure according to claim 5 in which each of said first cooperating roller and said second cooperating roller engages both the upper and lower spans of the endless band.

7. The support structure according to claim 5 in which: said disposed means of said third means includes:
    a pair of rods fixedly supported by said first rotatably support means and disposed between the spans of the endless band, said rods having their axes substantially parallel to each other and to the axes of said first end roller and said first cooperating roller;
    at least one roller unit mounted on said rods, said roller unit including a first roller mounted on one of said rods and a second roller mounted on the other of said rods;
    said first roller being disposed in spaced cooperating relation to said second roller of said roller unit;
    and means to move said first and second rollers of said roller unit toward each other to move the adjacent portions of said first end roller and said first cooperating roller away from each other;
and said disposed means of said fourth means includes:
    a pair of rods fixedly supported by said second rotatably support means and disposed between the spans of the endless band, said rods having their axes substantially parallel to each other and to the axes of said second end roller and said second cooperating roller;
    at least one roller unit mounted on said rods, said roller unit including a first roller mounted on one of said rods and second roller mounted on the other of said rods;
    said first roller being disposed in spaced cooperating relation to said second roller of said roller unit;
    and means to move said first and second rollers of said roller roller unit toward each other to move the adjacent portions of said second end roller and said second cooperating roller away from each other.

8. The support structure according to claim 7 in which:
said roller unit of said disposed means of said third means includes a pair of retainers disposed on opposite sides of said first and second rollers;
means to secure said pair of retainers to one of said rods;
said movable means of said third means includes adjustable screws cooperating with each of said retainers and the other of said rods;
said roller unit of said disposed means of said fourth means includes a pair of retainers disposed on opposite sides of said first and second rollers;
means to secure said pair of retainers to one of said rods;
and said movable means of said fourth means includes adjustable screws cooperating with each of said retainers and the other of said rods.

9. The support structure according to claim 1 in which:
said third means includes:
a first cooperating roller disposed between the spans of the endless band;
said first rotatably support means supporting each end of said first cooperating roller so that the axes of said first cooperating roller and said first end roller are substantially parallel;
and means disposed between said first end roller and said first cooperating roller to move the central portion of said first end roller and said first cooperating roller away from each other to form bows of opposite curvature in said first end roller and said first cooperating roller whereby the axes of said first end roller and said first cooperating roller are curved away from each other.

10. The support structure according to claim 9 in which said first cooperating roller engages both the upper and lower spans of the endless band.

11. The support structure according to claim 9 in which:
said disposed means of said third means includes:
a pair of rods fixedly supported by said first rotatably support means and disposed between the spans of the endless band, said rods having their axes substantially parallel to each other and to the axes of said first end roller and said first cooperating roller;
at least one roller unit mounted on said rods, said roller unit including a first roller mounted on one of said rods and a second roller mounted on the other of said rods;
said first roller being disposed in spaced cooperating relation to said second roller of said roller unit;
and means to move said first and second rollers of said roller unit toward each other to move the adjacent portions of said first end roller and said first cooperating roller away from each other.

12. The support structure according to claim 11 in which:
said roller unit of said disposed means of said third means includes a pair of retainers disposed on opposite sides of said first and second rollers;
means to secure said pair of retainers to one of said rods;
and said movable means of said third means includes adjustable screws cooperating with each of said retainers and the other of said rods.

References Cited
UNITED STATES PATENTS 2,797,089   6/1957   Lorig.

EDWARD A. SROKA, Primary Examiner

U.S. Cl. X.R.

74—241; 198—202

UNITED STATES PATENT OFFICE
CERTIFICATE OF CORRECTION

Patent No. 3,519,121                                    July 7, 1970

Herman J. Baldwin et al.

It is certified that error appears in the above identified patent and that said Letters Patent are hereby corrected as shown below:

Column 5, line 73, "rottably" should read -- rotatably --. Column 6, line 16, "sad" should read -- said --; line 17, after "by" insert -- the axes of said first end roller and --; line 22, "secondary" should read -- second --; line 70, after "and" insert -- a --. Column 7, line 1, cancel "roller", second occurrence. Column 8, line 20, "said" is part of the sub-paragraph beginning at line 17 and should be indented the same as "the" in line 19 and "other" in line 21.

Signed and sealed this 23rd day of February 1971.

(SEAL)
Attest:

Edward M. Fletcher, Jr.
Attesting Officer

WILLIAM E. SCHUYLER, JR.
Commissioner of Patents